(12) United States Patent
Bryan et al.

(10) Patent No.: US 12,203,423 B2
(45) Date of Patent: *Jan. 21, 2025

(54) FUGITIVE GAS DETECTION SYSTEM

(71) Applicant: Gas Activated Systems, Inc., The Woodlands, TX (US)

(72) Inventors: Michael A. Bryan, Spring, TX (US); Jerry W. Noles, Blanchard, OK (US)

(73) Assignee: GAS ACTIVATED SYSTEMS, INC., The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/200,657

(22) Filed: May 23, 2023

(65) Prior Publication Data
US 2023/0296064 A1 Sep. 21, 2023

Related U.S. Application Data

(63) Continuation of application No. 17/688,428, filed on Mar. 7, 2022, now Pat. No. 11,698,035, which is a
(Continued)

(51) Int. Cl.
*F02D 41/00* (2006.01)
*F02D 41/04* (2006.01)
(Continued)

(52) U.S. Cl.
CPC ..... *F02D 41/0002* (2013.01); *F02D 41/0027* (2013.01); *F02D 41/042* (2013.01);
(Continued)

(58) Field of Classification Search
CPC ............. F02D 41/0002; F02D 41/0027; F02D 41/042; F02D 41/1441; F02D 41/22; F02D 41/021; F02D 41/144; F02D 41/0025; F02D 2041/225; F02D 2200/04; F02D 2200/0602; F02D 2200/0611; F02D 2200/101; G08B 21/16; G08B 25/009; H04W 12/009; H04W 88/16
(Continued)

(56) References Cited

U.S. PATENT DOCUMENTS 5,311,851 A 5/1994 Wright, Jr.
5,592,387 A 1/1997 Shelef et al.
(Continued)

FOREIGN PATENT DOCUMENTS

CN 20120100464 4/2019

OTHER PUBLICATIONS

PCT International Search Report and Written Opinion from PCT App. No. PCT/US2018/068013 dated Apr. 16, 2019, 12 pages.

*Primary Examiner* — Hai H Huynh
(74) *Attorney, Agent, or Firm* — Lexigent LLC

(57) ABSTRACT

A fugitive gas detection system is provided. The system includes a cloud service, a plurality of reach-based components, a plurality of wireless gas sensors. The reach-based components comprise backhauls and gateways. The wireless gas sensors are acted as nodes to acquire sensor data in a local mesh network and the nodes are connected to the cloud service through the reach-based components, one node can transmit the sensor data to other sensor nodes of the local mesh network. The system measures flammable gas levels with speed, economy and accuracy.

19 Claims, 9 Drawing Sheets

Related U.S. Application Data continuation of application No. 17/107,021, filed on Nov. 30, 2020, now Pat. No. 11,661,896, and a continuation of application No. 16/236,148, filed on Dec. 28, 2018, now Pat. No. 11,268,459, said application No. 17/107,021 is a continuation-in-part of application No. 15/980,445, filed on May 15, 2018, now Pat. No. 10,851,728.

(60) Provisional application No. 62/662,977, filed on Apr. 26, 2018, provisional application No. 62/617,855, filed on Jan. 16, 2018, provisional application No. 62/617,899, filed on Jan. 16, 2018, provisional application No. 62/611,391, filed on Dec. 28, 2017, provisional application No. 62/525,470, filed on Jun. 27, 2017, provisional application No. 62/506,248, filed on May 15, 2017.

(51) Int. Cl.

| | | |
|---|---|---|
| *F02D 41/14* | (2006.01) | |
| *F02D 41/22* | (2006.01) | |
| *G08B 21/16* | (2006.01) | |
| *G08B 25/00* | (2006.01) | |
| *H04W 12/00* | (2021.01) | |
| *H04W 88/16* | (2009.01) | |

(52) U.S. Cl.
CPC ......... *F02D 41/1441* (2013.01); *F02D 41/22* (2013.01); *G08B 21/16* (2013.01); *G08B 25/009* (2013.01); *H04W 12/009* (2019.01); *H04W 88/16* (2013.01); *F02D 2041/225* (2013.01); *F02D 2200/04* (2013.01); *F02D 2200/0602* (2013.01); *F02D 2200/0611* (2013.01)

(58) Field of Classification Search
USPC ................ 701/103, 107, 110, 111, 112, 113; 123/481, 198 D; 73/114.38
See application file for complete search history.

(56) References Cited

U.S. PATENT DOCUMENTS

| | | |
|---|---|---|
| 7,345,590 B2 | 3/2008 | Nakano et al. |
| 8,944,014 B2 | 2/2015 | Cutlip et al. |
| 9,109,935 B2 | 8/2015 | Yang et al. |
| 9,652,955 B1 | 5/2017 | Ray et al. |
| 2010/0217500 A1 | 8/2010 | Watkins et al. |
| 2013/0311558 A1 | 11/2013 | Kim et al. |
| 2017/0171692 A1 | 1/2017 | Shinohara et al. |
| 2021/0310428 A1 | 10/2021 | Bryan et al. |

| Filters | update | download | activation | ack | error | | |
|---|---|---|---|---|---|---|---|
| time | counter | port | | | | | |
| △ 21:26:29 | 1 | 1 | | devid: gas001 | payload: 48:65:6C:6F:2C:20:77:6F:72:6C:64:21 | celsius: -3.5 | mbar:995 |
| △ 22:23:27 | 0 | 1 | Retry | devid: gas001 | payload: 48:65:6C:6F:2C:20:77:6F:72:6C:64:21 | celsius: -3.5 | mbar:995 |
| △ 21:24:33 | 0 | 1 | | devid: gas001 | payload: 48:65:6C:6F:2C:20:77:6F:72:6C:64:21 | celsius: -3.5 | mbar:995 |
| △ 21:22:04 | 17 | 2 | | devid: gas001 | payload: 57:6C:78:48:20:EC:90:09:1C:71:62:1C:BA | celsius: -18.5625 | mbar:997 |

FIG. 5A

FUGITIVE GAS DETECTION SYSTEM

CROSS-REFERENCE TO RELATED APPLICATIONS

This application claims the benefit of U.S. Provisional Patent Application No. 62/611,391, filed Dec. 28, 2017; U.S. Provisional Application No. 62/617,855, filed Jan. 16, 2018, U.S. Provisional No. 62/617,899, filed Jan. 16, 2018; U.S. Provisional No. 62/662,977, filed Jan. 16, 2018; U.S. application Ser. No. 15/980,445, filed May 15, 2018; and PCT Application No. PCT/US2018/032725, filed May 15, 2018, the disclosures of which are incorporated herein by reference in its entirety.

FIELD

The disclosure relates generally to analysis instruments and sensors. The disclosure relates specifically to gas sensors for detecting gas leaks in the oil and gas industry.

BACKGROUND

Fire and explosion are some of the most serious hazards associated with hydrocarbon production. During drilling, fracturing, completions and other oil well exploration and production processes, there are ample opportunities for hydrocarbon gas or vapor to be released. Detecting both systematic and random leaks in the oil and gas industry has become a priority for operators upstream, midstream, and downstream. Due to the explosive nature of gas, it is necessary to locate and repair leaks to prevent accidents and to keep operations at their optimum. Preventing accidents not only saves lives and assets, but also minimizes production losses. Additionally, the emissions of these toxins have been found to be damaging to the environment, for example, USA, Canada and Mexico account for nearly 20% of global oil and gas methane pollution. Available at https://www.edf.org/sites/default/files/na-methane-policy-brief_english.pdf. Governmental agencies around the world now require operators to monitor and remediate leaks in their processes.

Gas leaks are present in all phases of currently operational oil and gas processes and at abandoned and orphaned oil wells. Leaks are identified at pressure points in the systems, such as at plugs, seals, gaskets and valves. From pipelines through refineries to storage facilities, leaks can be detected and mitigated through a variety of technological. Majority of oil and gas fugitive and vented emissions are methane ($CH_4$) emissions that come from: Natural gas production, processing, transmission, distribution and oil production. While fugitive gas is primarily methane, it also contains other heavier hydrocarbons such as ethane, propane, butane and acetone.

Fugitive gas on any oil and gas production site is a hazard not only to the hydrocarbon emissions of the collective Greenhouse Gases (GHG), but also poses immediate risk for explosions when it comes in contact with diesel engines.

Governments are imposing legislation on the oil and gas industry to remedy methane emissions. This is driving technological advances in gas detection in a number of ways. Firstly, detecting hazardous levels of combustible gas or solvent vapor in air, which is expressed in % Lower Explosive Limit (LEL) has become a requirement in hazardous areas such as oil fields that have active machinery. Secondly, a drastic reduction in the footprint of sensors units make them easy to distribute across the facility for triangulation of fugitive sources. Additionally, utilizing MEMS-based programming, connectivity and intelligence is more easily adapted to the sensor unit such as: diagnostics, analytics, communication protocols and mitigation procedures. The instrumentation will be exposed to harsh conditions and foul weather; therefore, it must be ruggedized and affordably replaced often.

While the most common solution is still "visual inspection/detection by a person walking (or driving or flying over)", there are a number of new technologies that have been developed to answer the call of this growing issue. To-date, Acoustic/Ultrasonic, Infrared, Fiber Optic, Hydrocarbon Sensing Cables, Mass Volume, Negative Pressure Wave, Statistical Analysis, RTTM and E-RTTM have all been deployed in the industry. The need to understand behavior of the fugitive gases has accelerated the development of new technologies that can provide constant monitoring and the capture of relevant historical data.

The foregoing has outlined rather broadly the features of the present disclosure in order that the detailed description that follows may be better understood. Additional features and advantages of the disclosure will be described hereinafter, which form the subject of the claims.

SUMMARY

An embodiment of the fugitive gas detection system comprises a cloud service; a plurality of reach-based components; a plurality of wireless gas sensors operating as nodes to acquire sensor data; wherein the nodes are connected to the cloud service through the reach-based components. In an embodiment, the reach-based components comprise backhauls and gateways. In an embodiment, the nodes are deployed near a monitoring field to form a local mesh network through self-organization, nodes can transmit the sensor data to other sensor nodes of the local mesh network. In an embodiment, the gas sensor is a MEMS based multigas sensor. In an embodiment, the MEMS based multigas sensor includes a plurality of probes to detect special qualities of a gas. In an embodiment, the special qualities of the measured gas are recorded by a radar chart, the MEMS based multigas sensor detects the species and concentration of the gas using the radar chart. In an embodiment, the gas is selected from the group consisting of methane, ethane, propane, butane, acetone, and methanol. In an embodiment, the gas a mixture of any two or more species of methane, ethane, propane, butane and acetone. In an embodiment, comprising each of the nodes includes an autonomous local controller. In an embodiment, the nodes further comprising sensors selected from level sensors, vibration sensors, state of valve sensors and pressure transducers. In an embodiment, the system further comprises an on-board GPS on each node. In an embodiment, the system further comprises an Industrial Internet of Things (IIoT) platform. In an embodiment, the system operates risk analysis using the sensors to determine a probability of risk for a given industrial site. In an embodiment, the system runs in a local controller mode in which each node is stand-alone and runs singularly and autonomously. In an embodiment, the system runs in a few nodes controller mode in which a potentially small number of nodes are operating autonomously and in a mesh network. In an embodiment, the system runs in a local mesh with local gateway mode in which local collection sensors and/or controllers are monitored by a local gateway. In an embodiment, the system runs in an autonomous mode in which local decision-making is included in the IIoT platform. In an embodiment, the system runs in a data analytics mode in which cloud-based data is analyzed by taking current and historical data to evaluate systemic releases, calculate long term risk performance and behavior. In an embodiment, the system runs edge computing algorithms allowing for local decisions to be made at the sensors. In an embodiment, the local decisions are selected from the group consisting of valve closure upon gas detection, valve closure after receiving kill signal from other nodes.

The present disclosure is directed to systems that may detect species and concentration of an explosive or flammable gas for a given industrial site. The gas can be methane, ethane, propane, butane, acetone, and methanol or a mixture of above compound. In one illustrative embodiment of a system in accordance with the present disclosure, the system includes a cloud service, a plurality of reach-based components, a plurality of wireless gas sensors. the reach-based components comprise backhauls and gateways. The wireless gas sensors are acted as nodes to acquire sensor data in a local mesh network and the nodes are connected to the cloud service through the reach-based components, one node can transmit the sensor data to other sensor nodes of the local mesh network. The gas sensor may be a MEMS based multigas sensor including a plurality of probes to detect special qualities of the gas. The special qualities of the measured gas are recorded by a radar chart, the MEMS based multigas sensor detects the species and concentration of the gas using the radar chart.

In some embodiments, each of the nodes includes an autonomous local controller and an on-board GPS.

The system further comprising an Industrial Internet of Things (IIoT) platform and can run in the following modes: local controller mode in which each node is stand-alone and runs singularly and autonomously; few nodes controller mode in which a potentially small number of nodes are operating autonomously and in a mesh network; local mesh with local gateway mode in which local collection sensors and/or controllers are monitored by a local gateway; autonomous mode in which local decision-making is included in the IIoT platform. A data analytics mode in which cloud-based data is analyzed by taking current and historical data to evaluate systemic releases, calculate long term risk performance and behavior. the system can run edge computing algorithms allowing for local decisions to be made at the sensors. The local decisions are selected from the group consisting of valve closure upon gas detection, valve closure after receiving kill signal from other nodes. The system can operate risk analysis using the sensors to determine a probability of risk for a given industrial site.

In some embodiments, the nodes further comprise sensors such as level sensors, vibration sensors, state of valve sensors and pressure transducers.

The system measures flammable gas levels with speed, economy and accuracy. Advanced sensor technology and sophisticated analysis software allows for the rapid detection, identification and quantification of a wide variety of gases. This sensor is able to identify and quantify multiple flammable gases on a single chip complete with accurate LEL determination. The system provides geolocation, and long-range wireless connectivity. Sensors can be deployed on fixed, mobile, and ancillary assets. Broad-based deployment becomes feasible by dramatically lowering the footprint utilizing a silicon lab-on-a-chip sensor. With its silicon cost-structure, large scale sensor deployment becomes feasible.

BRIEF DESCRIPTION OF THE DRAWINGS

In order that the manner in which the above-recited and other enhancements and objects of the disclosure are obtained, a more particular description of the disclosure briefly described above will be rendered by reference to specific embodiments thereof which are illustrated in the appended drawings. Understanding that these drawings depict only typical embodiments of the disclosure and are therefore not to be considered limiting of its scope, the disclosure will be described with additional specificity and detail through the use of the accompanying drawings in which:

FIG. 5A-5B depict a table and graph showing the parameters of sensors of the system;

DETAILED DESCRIPTION

The particulars shown herein are by way of example and for purposes of illustrative discussion of the preferred embodiments of the present disclosure only and are presented in the cause of providing what is believed to be the most useful and readily understood description of the principles and conceptual aspects of various embodiments of the disclosure. In this regard, no attempt is made to show structural details of the disclosure in more detail than is necessary for the fundamental understanding of the disclosure, the description taken with the drawings making apparent to those skilled in the art how the several forms of the disclosure may be embodied in practice.

The following definitions and explanations are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary 3rd Edition.

Conventionally, various types of combustible gas sensors are utilized throughout the oil and gas industry in the largely manual detection of singular gases. Technologies utilized include electrochemical, photoionization, metal oxide semiconductor, catalytic, infrared, and laser. But these sensors only detect a single species. Therefore, in order to detect different combustible gases such as methane, ethane, propane, butane and acetone, different kinds of gas sensors should be employed to detect different kinds of gas, which will Increase the cost and complicate the gas detection system. Additionally, conventional gas sensors do not detect others or significantly under-report other gases.

Figure 1:
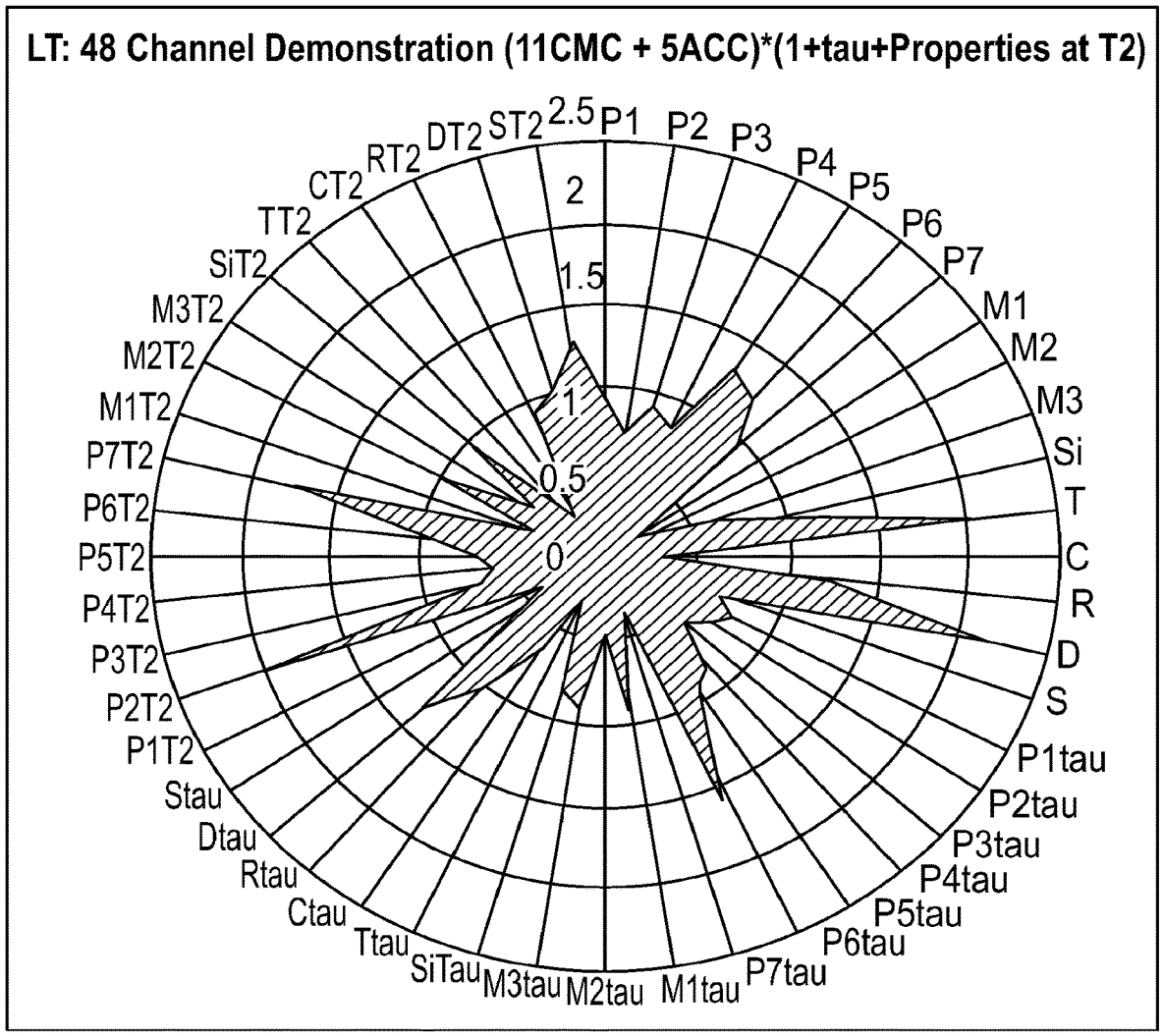
FIG. 1 is a radar chart showing a measured result of a sensor in accordance with one aspect of the present disclosure.

In some embodiments, a MEMS based multigas sensor using a variety of on-chip tests to determine which gas is being detected is illustrated. Multiple probes of the multigas sensor are included in a MEMS array constructed using semiconductor fabrication techniques. Each probe detects a special quality of the measured gas. All the measured results on the probes can determine which gas is detected. Special qualities of the measured gas include but not limited to redox potential, air viscosity, air pH and many other analyses such as differential thermal analysis (DTA) and differential scanning calorimetry (DSC). Different gases have different sensitivity on different probes of the MEMS based multigas sensor, just like different materials having different characteristic spectrum in spectral analysis. In one embodiment, the MEMS based multigas sensor has 48 probes to detect 48 special qualities of the measured gas. Referring to FIG. 1, a radar chart shows the measured result of the sensor. Each test or value is a different spoke on the radar chart to represent a special quality of the measured gas. Different kinds of gases have different values on different spokes. Even two same kind of gases will have different values on the same spoke if they have different concentration. The radar charts of different gases with different concentration can be stored in a memory prior to performing detection. During the process of detection, data collected from the probes of the MEMS based multigas sensor forms an instant radar chart. Comparing the instant radar chart and radar charts stored in the memory, the matched chart in the memory indicates the gas type and its concentration.

In some embodiments, the fugitive gas is a mixture of compounds comprising such as methane and ethane or further comprising propane. Prior to performing detection, the response of the probes of the sensor corresponding to the mixture with different concentrations can be stored in a memory to form a table. In an embodiment, each concentration of the mixture corresponds values of the probes. Then the sensor detects the mixture and gets detection values of the probes, a program is employed to looking up in the table the response characteristics and matching against an existing response. In some embodiments, the Multigas sensor is a detector made by Nevada Nanotech Inc.

In some embodiments, the sensor can detect new gas. Historically to teach a detector a new gas takes much time and money to quantify each of the detected parameters and to correlate an effect from a compound with an individual test. This is a reductionist-based method and certainly is the most complete, and versatile. However, simply exposing the detector to a compound and recording electronically the response can perform a qualitative method of calibrating to a new gas. To be sure, there is no knowledge of any chemical quality of the new compound, except for the detector response. For example, Prior to performing detection, the response of the probes of the sensor corresponding to the new compound with different concentrations can be stored in a memory to form a table. Exposing the sensor to the compound and recording electronically the response, looking up in the table the response characteristics and matching against an existing response, such that the concentration of the new compound can be determined. The key point is the gas does not even have to be known to learn. This allows the calibration and education for a new gas species to occur in seconds rather than months.

A plurality of the sensors can be used in a fugitive gas detection system to monitor and quantify gas emissions at oil and gas exploration and production sites, refineries, storage and transmission facilities. Through this system, gas emissions can be monitored, mapped and analyzed in real-time, providing the intelligence necessary for immediate remediation of methane and other combustible emission sources.

Figure 2:
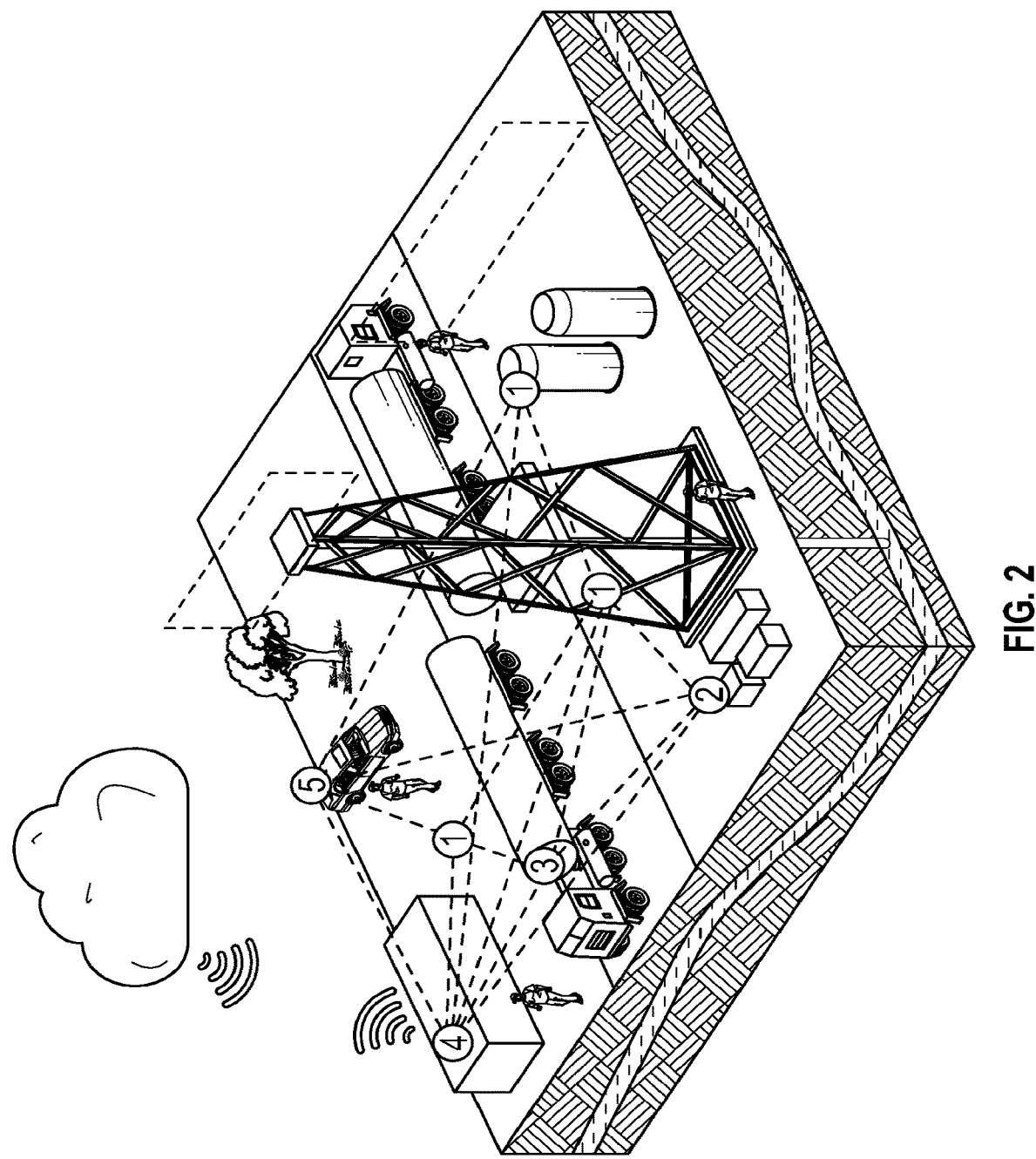
FIG. 2 depicts a graphic illustrating an arrangement of several sensors based at multiple locations in a given site with communication to a local central controller in accordance with the present disclosure.

FIG. 2 graphically depicts one arrangement of several sensors based at multiple locations in a given site with communication to a local central controller in accordance with the present disclosure. Sensors are deployed throughout a hydrocarbon production or processing site. These may be sensor 1 on or near production sites and storage, sensor 2 on or near engines servicing the hydrocarbon production site and sensors 3 and 5 on or near engines on vehicles. A local central controller 4 may also be disposed at the site. The sensors and local central controller 4 may be in operative communication via a wireless network or wired networks or as is otherwise known in the art. The local controller 4 may be in communication with a cloud based backup or remote controller.

Figure 3:
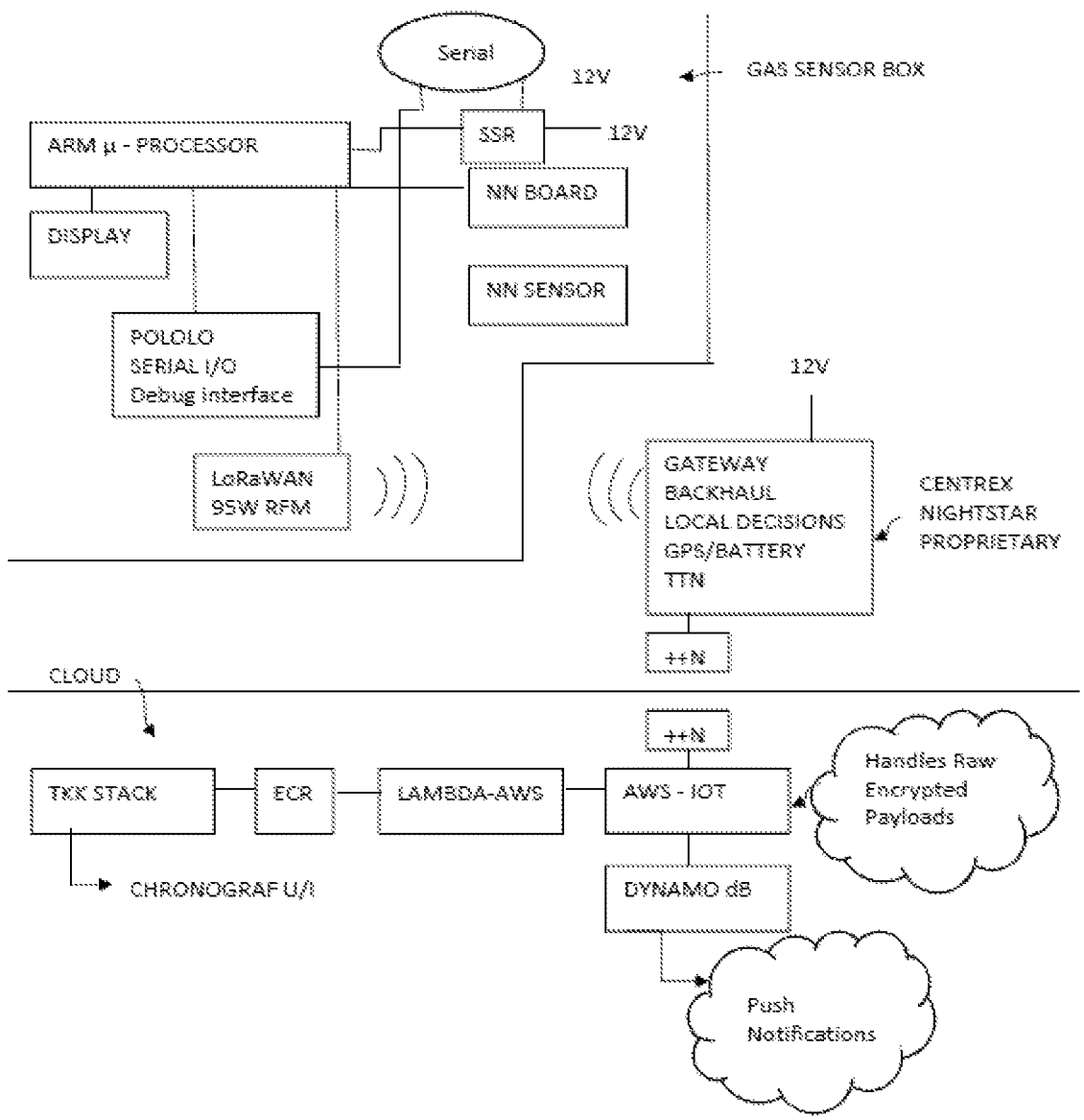
FIG. 3 depicts a schematic arrangement of one illustrative embodiment of a cloud-based system and wireless sensor networks in accordance with the present disclosure.

FIG. 3 depicts a schematic arrangement of one illustrative embodiment of a cloud-based system and wireless sensor networks in accordance with the present disclosure. The system includes a cloud service, a gateway and a plurality of wireless sensors. For simplicity, only one wireless sensor is shown in FIG. 3, however, the system may include a plurality of wireless sensors located across a wide area. The wireless sensor operates as a node to acquire sensor data. The wireless sensor has the ability to connect to a gateway or other wireless sensors. The illustrative wireless sensor includes a gas sensor box. A processor, a displayer, a serial of I/O and debug interface, a gas sensor, an SSR (Scalable Source Routing) module and a wireless communication module are all assembled in the box. The processor controls the gas sensor to detect gas where the wireless sensor deployed. When the concentration and type of the gas is determined, the processor drives the displayer to display the detection results. SSR is a routing protocol for the sensor network. Every node periodically broadcasts a "hello" message to its physical neighbor sensors, notifying the neighbor sensors of its existence. "Hello" messages include a list of the physical neighbor sensors of each node. If the node finds itself included in the "hello" message of another node, it assumes a bidirectional connection, and adds the other node to its list of physical peers. The I/O and debug interface allows simplifying development and debugging the wireless sensor. In one embodiment, a plurality of sensor nodes deploys near the monitoring field to form a local mesh network through self-organization, Sensor nodes monitor the collected data to transmit along to other sensor nodes. The short-range communication networks can be but not limit to a Bluetooth type of network, a ZigBee type of network or a WiFi type of network.

In some embodiments, the node can further include autonomous, low-cost sensor/controllers in wireless communication and subscribed to the local mesh. One node can cause action to other node in the local mesh network. For instance, a first sensor in a first node detects a high and increasing level of methane, it will transfer the message to the cloud service and operate some local action before receiving control signal from the cloud service. Local action includes first shutting off the associated engine electronically. If conventional means do not shut-off the engine, an air intake shutoff valve is actuated, stopping all intake air from entering the engine. Immediately thereafter, the autonomous sensor sends an alert to other nearest-neighbor members of the mesh to close their associated valves and stop their engines in anticipation of the methane concentration increase.

In some embodiments, each controller contains a wide variety of hardware components. The system includes an on-board GPS on each mesh node. A gateway controller monitors continuously the location of each node in real time.

This allows local action or control of specific member nodes based on physical location (such as downwind from a gas release) or physical proximity (such as nearest neighbors to a release site or other mesh members). The nodes each self-report their location and proximity to each other, even after movement within the field, providing complete ease of use and no need of reassignment by an administrator.

Traditional hub and spoke networks relied entirely upon the device in the middle that served no other purpose but to regulate traffic to another hub upstream. Mesh networks rely on peer-to-peer communication and allow each node to decide which hub in its range it may select at any given moment based on signal strength and network traffic. This also negates network failure due to a single hub collapse. It is truly self-healing in that each of the nodes contain the intelligence to find the most efficient pathway for the data they carry.

Figure 4:
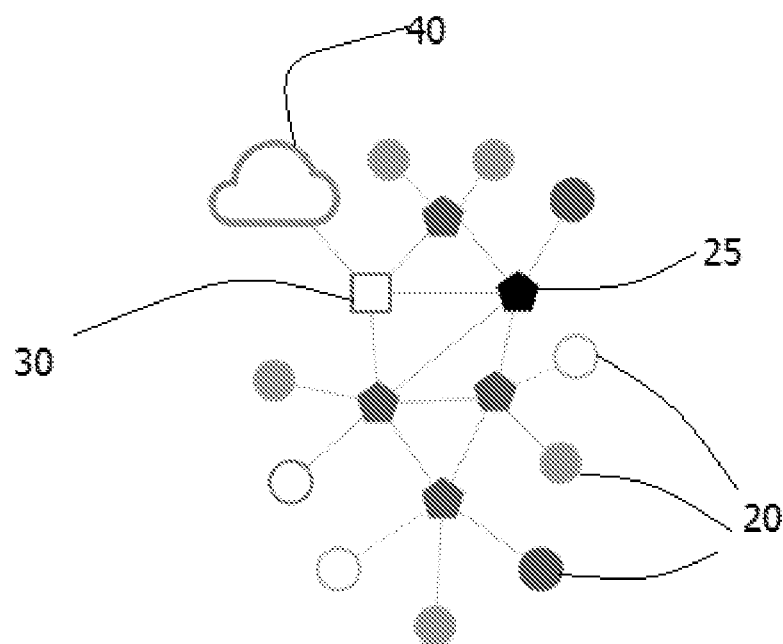
FIG. 4 shows a sample mesh networks including gateway connecting to a cloud.

The wireless sensor nodes are connected to the cloud service through a gateway. FIG. 4 shows a sample mesh networks including gateway connecting to a cloud. A plurality of sensor nodes 20 are connected to a router 25 and a plurality of router 25 are connected to a gateway 30 by short-range wireless connectivity. The gateway 30 is connected to the cloud service 40 using long-range wireless connectivity. the cloud service 40 can collect data from all of the sensor nodes 20 and output control signals to different kinds of actuators in the system to prevent fire and explosion near the monitoring field.

The gateway 30 is responsible for mesh element member subscription/de-subscription. This includes mobile assets that contain wireless sensors. A truck that has a wireless sensor joins the mesh when within a critical radius, such as a drilling lease. As the mobile asset leaves the location, it is de-subscribed from the mesh.

Mesh with gateway and cloud reporting: Each installation is easily configured to log location, gas species and concentration. This has specific value for forensic discovery in the event of an explosive gas release, site explosion, or other similar event.

Mesh network with gateway and proprietary backhaul enable communication to and from the cloud, even in areas with no conventional wireless service. The system uses long range repeaters that allow prompt cloud IO based on multiple long range wireless protocols including LoRaWAN, Zigbee and others.

In an embodiment, the system is comprised of the following sub-components:

Mesh network element: Autonomous, low-cost sensor/controllers in wireless communication and subscribed to the local mesh. One member can cause action to other member in the local mesh network. For instance, a first sensor detects a high and increasing level of methane. Local action includes first shutting off the associated engine electronically. If conventional means do not shut-off the engine, an air intake shutoff valve is actuated, stopping all intake air from entering the engine. Immediately thereafter, the autonomous sensor sends an alert to other nearest-neighbor members of the mesh to close their associated valves and stop their engines in anticipation of the methane concentration increase.

Gateway (executive mesh network controller): The system can be run with a node subscribe/de-subscribe in place, such that the members at any moment are the nodes that are truly local. Specifically, it is important to verify that all members are local so that if an event, such as a recorded gas release occurs on a member node, the node is actually in the local area. For example, if a mobile asset leaves the local environment but does not de-subscribe, tens of miles down the road, a gas release is recorded—it does not make sense to cause action at the original site since the release did not originate there.

Backhaul (connection to the cloud): The system can utilize a chain of very low cost, low-power repeaters to deliver a signal in a near-instantaneous fashion to a conventional network if needed. Where wireless is already available, systems can integrate into commonly deployed networks.

In an embodiment, platform provides user-configurable response and real-time intelligent insights throughout the local network of fixed, ancillary and mobile assets. Local alerts provide prompt actions and current data to local field personnel.

The fugitive gas detection system can be run with a node subscribe/de-subscribe in place, such that the nodes at any moment are the nodes that are truly local. Specifically, it is important to verify that all nodes are local so that if an event, such as a recorded gas release occurs on a node, the node is actually in the local area. For example, if a mobile asset leaves the local environment but does not de-subscribe, tens of miles down the road, a gas release is recorded—it does not make sense to cause action at the original site since the release did not originate there. The system can utilize a chain of very low cost, low-power repeaters to deliver a signal in a near-instantaneous fashion to a conventional network if needed. Where wireless is already available, the system can integrate into commonly deployed networks.

In some embodiments, each wireless sensor is configured to log location, gas species and concentration. This has specific value for forensic discovery in the event of an explosive gas release, site explosion, or other similar event, all the data can report to the cloud service 40 through the mesh network. Mesh network with gateway and proprietary backhaul enable communication to and from the cloud service, even in areas with no conventional wireless service. The system uses long range repeaters that allow prompt cloud IO based on multiple long-range wireless protocols including LoRaWAN, Zigbee and others. The system can utilize a chain of very low cost, low-power repeaters to deliver a signal in a near-instantaneous fashion to a conventional network if needed. Where wireless is already available, and the system can integrate into commonly deployed networks.

The system can operate risk analysis using a variety of sensors. In general, the analysis is straightforward to determine a probability of risk for a given industrial site. Each site or node or zone or pipe or connector or any item has a probability of event, where an event might be a leak, a failure to close, or to open, or explosion. A probabilistic model where each individual probability of failure over a time interval is multiplied and the resulting product is the overall probability of failure or risk in the time interval. Conventionally, this has been done with very long-time intervals, such as a year. However, using very low cost, wireless sensors to detect leaks such as gas or liquid, or states of valves, liquid levels or other situations in real time, an instant probability of risk can be calculated in real time using a mesh network, connected devices and real time calculations. In addition, the data can be pushed to the cloud service to a time series database for real-time higher-level analysis.

In some embodiments, the cloud-based system includes an Industrial Internet of Things (IIoT) platform. The IIoT is a software stack that can be embedded into hardware devices such as industrial control systems or network gateways. The software stack may include its own software development kit (SDK). The SDK includes functions that enable developers to leverage the core features that will described below. A multitude of sensors and controllers are connected to the IIoT platform by the mesh network. The resulting systems, and even the individual sensors and controllers, can monitor, collect, exchange, analyze, and instantly act on information to intelligently change their behavior or their environment— all without human intervention.

The cloud-based fugitive gas detection system includes a full IIoT platform for the purpose of environment monitoring and asset preservation, chiefly through the real-time monitoring of explosive and combustible gases including methane, natural gas (with constituents including methane, butane and pentane), explosive and volatile compounds including acetone. Early and prompt gas detection allows rapid and decisive action to be taken in order to prevent asset destruction and loss of life.

The fugitive gas detection system includes local nodes, wireless and reach-based components. The local nodes comprise sensor, autonomous controller, and engine overspeed protection through immediate intake air shut-off. The wireless comprises GPS based location, a true mesh network of all sensors and controllers. The reach-based components comprise backhaul and gateway.

The fugitive gas detection system can run in one of the following modes: Local controller mode in which each node is a stand-alone system that runs singularly and autonomously. Uses include monitoring gas levels and emergency overspeed control of an engine, either using an electronic kill signal or by a fully integrated shut-off valve; Few Nodes controller mode in which a potentially small number of nodes are operating autonomously and in a true mesh network. Uses include gas monitoring and engine shutdown of nearest neighbors, once an explosive or combustible is detected at one controller node; Local mesh with local gateway mode in which a local collection sensors/controllers are monitored by a local gateway; autonomous mode in which advanced local decision-making is included in the IIoT package, This will enable among other tasks, to calculate real time risk; Data Analytics mode in which cloud-based data is analyzed by taking current and historical data to evaluate systemic releases, calculate long term risk performance and behavior.

In some embodiments, the fugitive gas detection system uses autonomous mesh network, gateway and backhaul communicate using LoRaWAN™, ZigBee® and other protocols. In addition, each node, the gateway and backhaul use an encrypted and safeguarded protocol that makes any form of malicious hacking virtually impossible. Edge computing algorithms allow for decisions to be made at the sensor level, providing discrete decisions thereby, remediating potential catastrophe. Big data becomes intelligence for historical reference and instant forensic discovery.

In some embodiments, each node includes an autonomous local controller that runs a short Linux® stack allowing for rapid action without a significant software overhead. Local decision making includes valve closure upon gas detection, valve closure after receiving kill signal from other mesh member and other tasks, such as recording non-critical gas species and concentrations. Beyond that, nodes can perform more mundane tasks such as recording levels of storage tank batteries and recording flow rates in midstream pipelines.

The fugitive gas detection system includes real-time dashboards to display the detection results of the system. The dashboards include local display, browser display and micro-display. The local display can be assigned to selected mesh member nodes, such as those resident in truck cabs or wearable nodes come with a high-resolution color display that can display a variety of information including: instantaneous gas level concentration and species, temperature, relative humidity and other weather specifics; occurrence of overspeed shut-off valve closure; mesh topology/location of other nearest neighbor mesh members including their status; atmospheric maps provide easily viewable reports of the field and the current or past status of gas leak events.

The fugitive gas detection system can use cloud communication to set activation points and display the real time performance of each mesh node. For instance, explosive or volatile gas set points can be implemented using the cloud interface. Trigger points for different gas classes can be set. A more sensitive set point for methane than for other gases is common. Cloud based communication provides the real-time reporting of sensor levels, actions taken such as overspeed shutoff valve actuation, and calculated site risk. The can provide a real-time risk assessment, in the form of probability. This in turn can be used to, with the right insurer, change or reduce insurance premiums if the reduction of risk is routinely demonstrated. All cloud-based IO is viewable on any conventional browser from a desktop, laptop, tablet or phone. Any authorized user can see the totality of cloud information as indicated above.

Figure 5B:
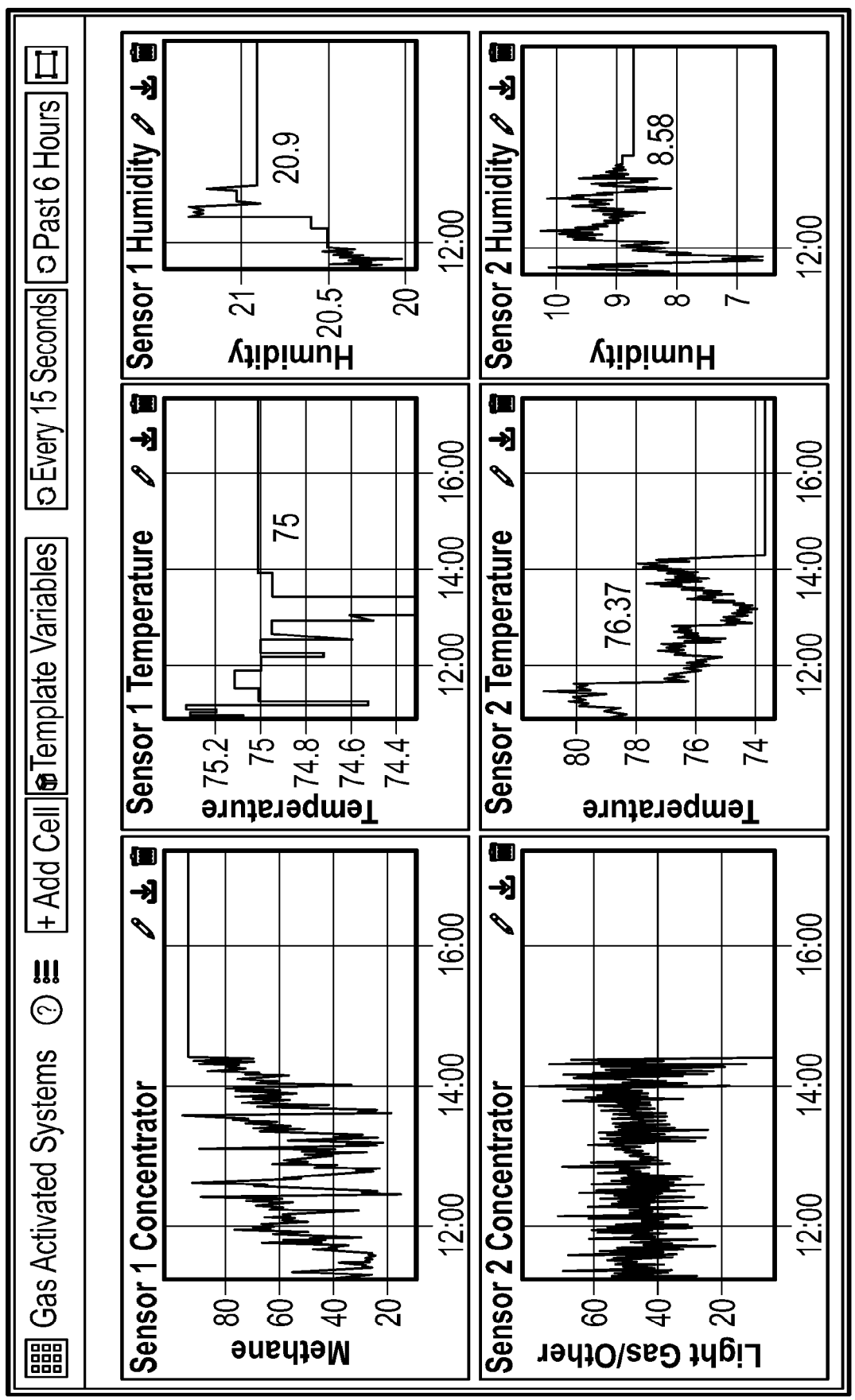
Figure 6:
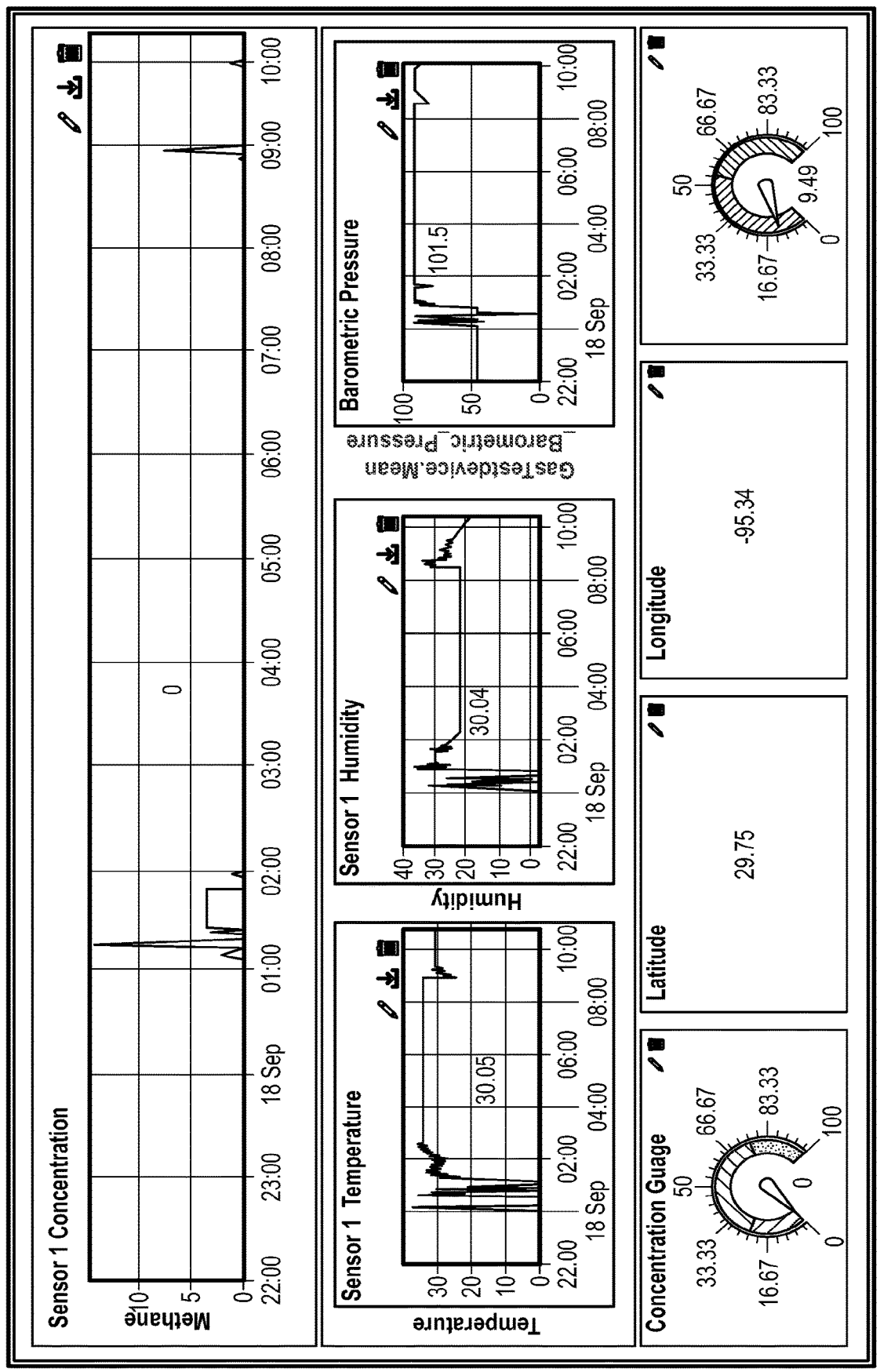
FIG. 6 depicts a graphic illustrating the parameters of sensors and controllers of the system.
Figure 7:
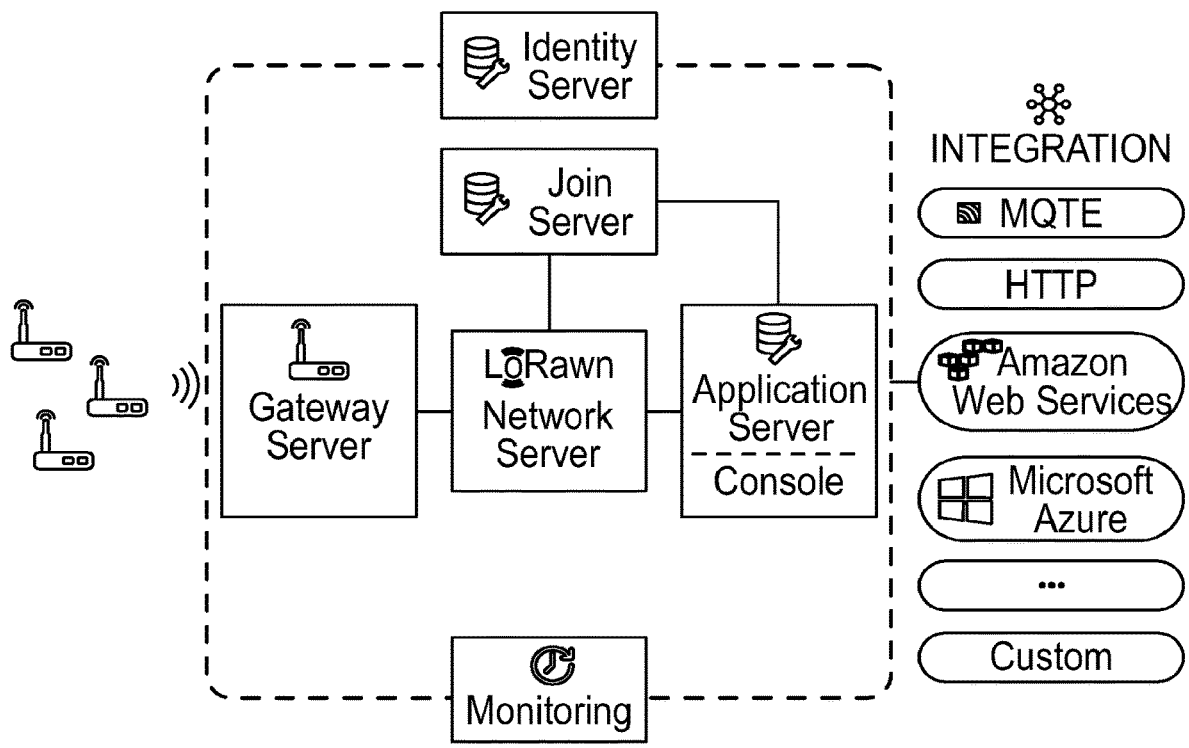
FIG. 7 depicts architecture of a commercial product TTH (the things network)
Figure 8:
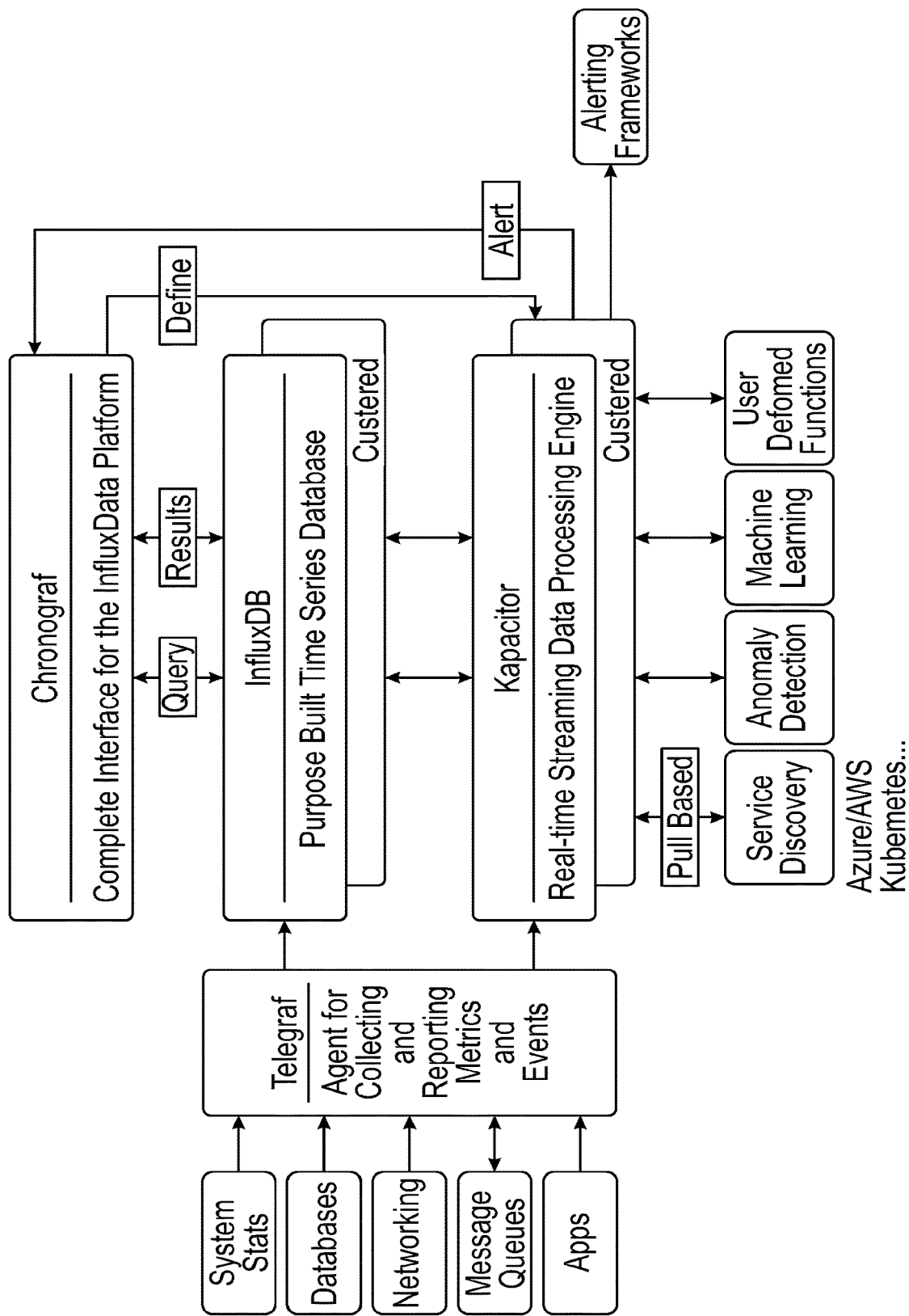
FIG. 8 depicts architecture of TICK stack, a commercial product.

Micro-display is a kind of small robust wireless displays which can be paired via Bluetooth with every gas detection system including mesh nodes, gateway and backhaul. These displays can be set via cloud-based instruction to display a variety of information and device states including gas detector response such as gas species, quantity and percentage of LEL, listing of other mesh members, map location and a large number of other relevant quantities. The data can be displayed as a table as shown in FIG. 5A or a graph as shown in FIG. 6.

In an embodiment, technology is a platform of wireless nodes, with an array of digital and analog inputs and outputs. Any detector input is included and any response is included.

Detectors can be but not limited to level sensors, vibration sensors, state of valve sensors, pressure transducers, or even simply a change in state or a command from either the cloud based time series database or from local node computation.

Outputs can include sending a signal to close a valve, send a message or work ticket that a tank battery needs to be tended to, or a SMS text notification to clear an area because it is unsafe. In addition, cloud-based display can be monitored from any browser and automatic actions can be set remotely, say a trigger of action when a liquid level reaches a certain height.

In an embodiment, the IoT platform can direct action to any type to cause an effect from either the node directly (using its onboard processing), or having sent data to the gateway and then to the cloud where time series database calculates or processes the incoming data, and arriving at an action, sends an instruction to a specific node, or a separate device that is devised to cause action, such as opening or closing a valve, draining a tank or the like. The point is, closing an overspeed shutoff device is not the only action.

In addition to gas sensor, the fugitive gas detection system can also include any other sensors. The sensors can be but not limited to level sensors, vibration sensors, state of valve sensors, pressure transducers. One specific sensor can be a three axis accelerometer inputting data to a wireless node. The three-axis device actually can report a three-dimensional vibration shape that corresponds to the engine, motor or other dynamic physical system. Over time, the engine, motor or other will undergo degradation from normal wear and tear or other type of degradation. The three-dimensional representation of the vibration characteristics will change and within certain limits, will report a new vibration state corresponding to engine deterioration or even additional engine load, change in fuel, air filter clog or other. Further, over time, the new shapes of three axis vibration potentially correlated with acoustic signals as well can be correlated to actual physical problems, again such as worn piston rings, poor fuel, excess engine loading, clogged air filter, clogged fuel filter, lack of oil, lack of coolant. In addition, the wireless node can also be attached to the engine computer port to correlate computer events with vibration and acoustic signals. Also, the device can either warn wirelessly, locally or over the cloud if the engine needs to be turned off to prevent further damage.

Various computation techniques can be employed to evaluate the data collected from the sensors including FFT (fast Fourier transform) of the data, either locally on the node, or on the cloud. Outputs from the cloud service or the local controller can include sending a signal to close a valve, send a message or work ticket that a tank battery needs to be tended to, or a SMS text notification to clear an area because it is unsafe. In addition, cloud-based display can be monitored from any browser and automatic actions can be set remotely, for example, a trigger of action when a liquid level reaches a certain height.

The fugitive gas detection system allows for a large number of deployments including but not limited to overspeed protection, tank farm/battery monitoring, gas leak detection, tank battery notification, fixed asset tagging and mobile asset tagging.

Overspeed protection in which the gas sensor is used, the system uses an engine overspeed valve (such as is manufactured by PacBrake, PowerHalt and AMOT for three examples). Upon gas detection, and suitable threshold reached, the system attempts to stop the engine via conventional means. If this does not cause the immediate engine cessation, the valve in the air shutoff closes shutting off the engine by smothering it. In either case, a subsequent explosion probability is reduced.

The system can deploy in a tank battery to monitor liquid levels, and to dispatch collection when liquid levels match or exceed pre-set levels.

The system can be used for Personal and Personnel Safety. For example, in Canada, it is common to drill or maintain wells with methanol in the well to suppress condensate. This is during all phases of the well. Every place where there may be a person is a hut due to extreme weather. A small water leak (from produced water) dripping a tiny bit on the floor can be a huge problem due to the methanol evaporating and making a cloud or vapor. A sudden door opening can cause a flash fire. Hence every worker has to carry two methanol detectors. Two because if a large amount of methanol gets on the detector surface, it is ruined. They cannot easily recover from a large methanol burst that damages the detector, thus the worker would switch to a second detector. The gas sensor of the present disclosure is fine if it gets a huge amount of methanol. Drench it and it will recover.

The small size of the node allows for a device that is wearable. The on-board microprocessor can monitor gas sensor from any manufacturer including Nevada nanotech for one example. The device also includes standard long-range wireless radios. In addition, it can include accelerometers, heart rate monitors, blood oxygen sensors and the like. Using a long-range compatible gateway, we tri-laterization can be used to provide a 3-d spatial location of an individual wearing a monitor. If the person falls the accelerometer detects it. The heart rate and blood $O_2$ provides additional data. The gas sensor detects and alerts both the wearer and by means of wireless, others outside of the environment of potential environmental threats.

The fugitive gas detection system can be deployed around the production site with a plurality of gas sensor nodes. Each hut and station can have one of the networked nodes monitoring for methanol. And Each personnel can wear a node that has location, gas sensor, basic biometrics (pulse, respiration, falling detector (accelerometer), pulse oximeter) to measure workers health and location. If a gas sensor finds methanol, or basic biometrics detect abnormal physiological indicator, they use LoRaWAN to communicate to other nodes, and to the cloud about concentration and location.

In an embodiment, the system can be utilized for including but not limited to:

Overspeed Protection—using the sensor technology, the IIoT system and in conjunction with an engine overspeed valve. Upon gas detection, and suitable threshold reached, the device attempts to stop the engine via conventional means. If this does not cause the immediate engine cessation, the valve in the air shutoff closes shutting off the engine by smothering it. In either case, a subsequent explosion probability is reduced.

Tank Farm/Battery Monitoring—the system can deploy in a tank battery to monitor liquid levels, and to dispatch collection when liquid levels match or exceed pre-set levels.

Asset location—semi-fixed assets can be tracked on the yard or in the field using the systems triangular location. This enables quick and easy location of similar assets instantly. Mobile assets can easily be tracked using our embedded GPS module.

All of the compositions and methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and methods and in the steps or in the sequence of steps of the methods described herein without departing from the concept, spirit and scope of the disclosure. All such similar substitutes and modifications apparent to those skilled in the art are deemed to be within the spirit, scope and concept of the disclosure as defined by the appended claims.

What is claimed is:

1. A fugitive gas detection system, comprising,
 a cloud service;
 a plurality of reach-based components;
 a plurality of wireless gas sensors operating as nodes to acquire sensor data, wherein at least one of the gas sensors is a MEMS based multigas sensor, the MEMS based multigas sensor includes a plurality of probes to detect special qualities of a gas and the special qualities of the measured gas are recorded by a radar chart, the MEMS based multigas sensor detects the species and concentration of the gas using the radar chart; and
 wherein the nodes are connected to the cloud service through the reach-based components.

2. The system of claim 1, wherein the reach-based components comprise backhauls and gateways.

3. The system of claim 1, wherein the nodes are deployed near a monitoring field to form a local mesh network through self-organization, nodes can transmit the sensor data to other sensor nodes of the local mesh network.

4. The system of claim 3, wherein comprising each of the nodes includes an autonomous local controller.

5. The system of claim 1, wherein the gas is selected from the group consisting of methane, ethane, propane, butane, acetone, and methanol.

6. The system of claim 1, wherein the gas a mixture of any two or more species of methane, ethane, propane, butane and acetone.

7. The system of claim 1, wherein the nodes further comprising sensors selected from level sensors, vibration sensors, state of valve sensors and pressure transducers.

8. The system of claim 1, further comprising an on-board GPS on each node.

9. The system of claim 1, further comprising an Industrial Internet of Things (IIoT) platform.

10. The system of claim 9, wherein the system operates risk analysis using the sensors to determine a probability of risk for a given industrial site.

11. The system of claim 9, wherein the system runs in a local controller mode in which each node is stand-alone and runs singularly and autonomously.

12. The system of claim 9, wherein the system runs in a few nodes controller mode in which a potentially small number of nodes are operating autonomously and in a mesh network.

13. The system of claim 9, wherein the system runs in a local mesh with local gateway mode in which local collection sensors and/or controllers are monitored by a local gateway.

14. The system of claim 9, wherein the system runs in an autonomous mode in which local decision-making is included in the IIoT platform.

15. The system of claim 9, wherein the system runs in a data analytics mode in which cloud-based data is analyzed by taking current and historical data to evaluate systemic releases, calculate long term risk performance and behavior.

16. The system of claim 9, wherein the system runs edge computing algorithms allowing for local decisions to be made at the sensors.

17. The system of claim 16, wherein the local decisions are selected from the group consisting of valve closure upon gas detection, valve closure after receiving kill signal from other nodes.

18. A fugitive gas detection system, comprising,
a cloud service;
a plurality of reach-based components;
a plurality of wireless gas sensors operating as nodes to acquire sensor data, wherein each node includes an on-board GPS; and
wherein the nodes are connected to the cloud service through the reach-based components.

19. A fugitive gas detection system, comprising,
a cloud service;
a plurality of reach-based components;
a plurality of wireless gas sensors operating as nodes to acquire sensor data, wherein a gas detected by each of the plurality of wireless gas sensors is selected from the group consisting of methane, ethane, propane, butane, acetone, and methanol; and
wherein the nodes are connected to the cloud service through the reach-based components.

* * * * *